(12) United States Patent
Van de Capelle (10) Patent No.: US 7,123,380 B2
(45) Date of Patent: Oct. 17, 2006

(54) METHOD AND A DEVICE FOR DETERMINING MULTI-INK COLOR SEPARATIONS

(75) Inventor: Jean-Pierre Van de Capelle, Rochester, NY (US)

(73) Assignee: Agfa-Gevaert N.V., Mortsel (BE)

( * ) Notice: Subject to any disclaimer, the term of this patent is extended or adjusted under 35 U.S.C. 154(b) by 980 days.

(21) Appl. No.: 10/143,492

(22) Filed: May 9, 2002

(65) Prior Publication Data

US 2003/0002061 A1 Jan. 2, 2003

Related U.S. Application Data

(60) Provisional application No. 60/290,125, filed on May 10, 2001.

(51) Int. Cl.
- *B41J 1/00* (2006.01)
- *B41J 35/16* (2006.01)
- *G06F 15/00* (2006.01)
- *G03F 3/08* (2006.01)
- *G06K 9/00* (2006.01)

(52) U.S. Cl. ............... 358/1.9; 358/520; 345/501; 347/172; 382/162; 382/167

(58) Field of Classification Search ............ 358/1.9, 358/520, 537, 1.1, 1.5, 1.6; 382/162, 167; 345/431, 501, 602, 604; 347/172
See application file for complete search history.

(56) References Cited

U.S. PATENT DOCUMENTS

| | | | |
|---|---|---|---|
| 5,268,754 A | 12/1993 | Van de Capelle et al. .. | 358/527 |
| 5,650,942 A | 7/1997 | Granger ................... | 364/526 |
| 5,689,349 A | 11/1997 | Plettinck et al. ........... | 358/500 |
| 5,734,800 A | 3/1998 | Herbert et al. ............ | 395/109 |
| 5,870,530 A | 2/1999 | Balasubramanian ........ | 395/109 |
| 5,892,891 A | 4/1999 | Dalal et al. ............... | 395/109 |

(Continued)

FOREIGN PATENT DOCUMENTS

EP    0586139    8/1993

(Continued)

OTHER PUBLICATIONS

A.U. Agar, "Model Based Color Separation for CMYKcm Printing", *Proceedings of The Ninth IS&T/SID Color Imaging Conference*, pp. 298-302, Scottsdale, AZ, Nov. 5-9, 2001.

(Continued)

*Primary Examiner*—Kimberly Williams
*Assistant Examiner*—Charlotte M. Baker
(74) *Attorney, Agent, or Firm*—Robert A. Sabourin (57) ABSTRACT

A method to convert a color provided in a first color space into a color in a second color space defined by more than four colorants and a reproduction process. The method includes converting the color into a third color space, determining which of a set of gamut volumes defined in the third color space is appropriate for the color, with each point in the gamut volume achievable by an area coverage greater than zero and less than 100% of two of the colorants and an area coverage greater than zero and less than 100% of one or more darkening colorants with the remaining colorants either absent or at 100%. The method further includes carrying out any gamut mapping on the converted color so that the converted color is in the appropriate gamut volume and converting the gamut mapped color from the third color space into a set of the colorants of the second color space, such that the surface of any gamut volume with no darkening colorant is part of an umbrella surface for the N inks.

6 Claims, 9 Drawing Sheets

U.S. PATENT DOCUMENTS

| | | | | |
|---|---|---|---|---|
| 5,991,511 | A | 11/1999 | Granger | 395/109 |
| 6,072,902 | A * | 6/2000 | Myers | 382/167 |
| 6,262,744 | B1 | 7/2001 | Carrein | 345/431 |
| 6,307,645 | B1 | 10/2001 | Mantell et al. | 358/1.9 |
| 6,335,800 | B1 | 1/2002 | Balasubramanian | 358/1.9 |
| 6,335,983 | B1 | 1/2002 | McCarthy et al. | 382/162 |
| 6,373,580 | B1 | 4/2002 | Walker | 358/1.1 |
| 6,480,301 | B1 * | 11/2002 | Cholewo | 358/1.9 |
| 6,922,197 | B1 * | 7/2005 | Saito | 345/602 |
| 2001/0017627 | A1 * | 8/2001 | Marsden et al. | 345/501 |

FOREIGN PATENT DOCUMENTS

| | | |
|---|---|---|
| EP | 0622952 | 4/1994 |

OTHER PUBLICATIONS

Finlayson, G. D., Morovic, P., Crossover Wavelengths of Natural Metamers, in Proceedings of Colour 2000 conference, Derby, UK, Apr. 2000.

Harold Boll, "A Color to Colorant Transformation for a Seven Ink Process," *Proceeding, IS&T's Third Technical Symposium on Proofing and Printing*, pp. 31-35, 1993.

J. Morovic, M. R. Luo, "A Universal Algorithm for Colour Gamut Mapping", Presented at the Colour Imaging in Multimedia conference, Derby, UK, 1998.

J. S. Arney, Charles D. Arney, and Peter G. Engeldrum, "Modeling the Yule-Nielsen Halftone Effect," *Journal of imaging science and technology*, vol. 40, p. 233, 1996.

J.P. Van de Capelle, "Trade-offs between fundamental and pragmatic colour management systems," *Proceedings, Colour Image Science 2000 (CIS' 2000)*, Derby, UK, pp. 127-136, Apr. 2000.

Nobbs, James H.: "Kubelka-Munk Theory and the Prediction of Reflectance", Rev. Prog. Coloration, vol. 15, pp. 66-75, 1985.

Jon Y. Hardeberg, "Acquisition and reproduction of colour images: colorimatric and multispectral approaches," *Thesis*, Docteur de L'ecole Nationale Supérieure des Télécommunications, Paris, France, Jan. 1999.

K. Schlaepfer, "The Colour Gamut of the Seven-Colour Printing Process," *Journal of Prepress and Printing Technology*, pp. 22-29, 1997.

M. Mahy and P. Delabastita, "Inversion of the Neugebauer Equations," *Color Research And Applications*, vol. 21, No. 6, pp. 365-374, 1996.

M. Mahy, "Calculation of Color Gamuts Based on the Neugebauer Model," *Color Research and Applications*, vol. 22, No. 6, pp. 404-411, 1997.

M.R. Pointer, "The Gamut of Real Surface Colors," *Color Research and Applications*, vol. 5, No. 3, pp. 145-155, 1980.

Patrick Emmel, Roger David Hersch, "Spectral Colour Prediction Model for Transparent Fluorescent Inks on Paper", *Proceedings of the IS&T/SID 6th Color Imaging Conference: Color Science, Systems and Applications*, Nov. 17-20, 1998, Scottsdale, Arizona, USA, pp. 116-122.

Jan Morovic, "To Develop a Universal Gamut Mapping Algorithm," *Thesis*, University of Derby, England, Oct. 1998.

B. Meireson and J.P. Van De Capelle, "A New Method For Characterizing Output Devices and Its Fit Into ICC and HIFI Color Workflows", Proc. of the Fifth IS&T/SID Color Imaging Conference , Nov. 1997, Scottsdale, AZ, pp. 66-69.

P. Emmel, Roger David Hersch, "A Model for Colour Prediction of Halftoned Samples Incorporating Light Scattering and Ink Spreading", Proceedings of the IS&T/SID 7th Color Imaging Conference: Color Science, Systems and Applications, pp. 173-181, Nov. 16-19, 1999, Scottsdale, Arizona, USA.

T. J. Cholewo and S. Love, "Gamut boundary determination using alpha-shapes," in Proceedings of the 7th Color Imaging Conference, (Scottsdale, Ariz.), pp. 200-204, Nov. 1999.

P. Emmel, Isaac Amidror, V. Ostromoukhov, Roger David Hersch, "Predicting the Spectral Behaviour of Colour Printers for Transparent Inks on Transparent Support", in Proceedings of the IS &T/SID 96 Color Imaging Conference: Color Science, Systems and Applications, Nov. 19-22, 1996 Scottsdale, Arizona, USA, pp. 86-91.

* cited by examiner

FIG. 3 (CMYKGRB)

FIG. 4 GMYKOGB

METHOD AND A DEVICE FOR DETERMINING MULTI-INK COLOR SEPARATIONS

RELATED PATENT APPLICATIONS

The present invention claims benefit of U.S. Provisional Patent Application Ser. No. 60/290,125 titled METHOD AND DEVICE FOR DETERMINING MULTI-INK COLOR SEPARATIONS, filed on May 10, 2001 to inventor Jean-Pierre Van de Capelle, Provisional Application 60/290,125 is incorporated herein by reference.

FIELD OF THE INVENTION

The present invention relates to computerized color graphics, color reproduction, and electronic printing systems. In particular, the present invention relates to a method for determining color separations in a multi ink printing system, such as an ink jet printer or a gravure press with six or more inks.

BACKGROUND OF THE INVENTION

Computerized color graphics systems and electronic printing systems are known in the art. Typically, they enable a user to produce a color image, e.g., any visual two-dimensional pattern including text, graphic line art, continuous tone images, etc., and from that image to produce a picture which can be printed using a color reproduction system, for example, by producing color separation plates for offset printing. There has been much effort in the past to develop ways to determine these "separations", especially for multi-ink systems, e.g. systems where more than four inks are being used, as is for example the case for very high quality color printing and in textile or decoration printing.

Printing may be carried out using halftoning, also called screening, which is the process of creating the illusion of a continuous tone ("CT," "contone") image using an output device—e.g., a printing device or other color reproduction device—capable only of binary output, for example with ink deposited or not deposited at any location on a substrate. For color printing, several images—called separations—are produced in the primary colorants, e.g., inks used to print in color, and printed on top of each other on a printing press. For typical four color printing, four images are produced in cyan ("C"), magenta ("M"), yellow ("Y") and black ("K"), and each of these images are halftoned. Usually, digital halftoning is used and the image is recorded using an imagesetter, laser printer, ink jet printer, digital film recorder, or other output device, i.e., a color reproduction device.

The color gamut of a four-color printing process using CMYK is not very large and therefore some colors cannot be reproduced using only CMYK. Thus, processes using more than four inks have been developed in order to increase the color gamut. An example of printing with at least six inks is PANTONE's Hexachrome® system from PANTONE, Inc., Carlstadt, N.J. consisting of CMYK inks complemented with an Orange and a Green ink (CMYKOG). Another example is known as Küppers' ink set that uses CMYK, a Red, a Green, and a Blue ink (CMYKOGB). See H. Küppers: "Die Farbenlehre der Fernseh-, Foto-und Drucktechnik", Du Mont Verlag., Köln, 1985.

Color may be specified with only three color coordinates, e.g., CIE XYZ or CIE Lab, so using six or seven or more colors for printing makes the calculation of the required ink values, e.g., the separations for any particular color rather complex. There are more values to determine —6 or more— than the three coordinates defining the color, so the problem is "underdetermined," i.e., there are more variables to be determined than inputs. The more inks, the more difficult the determining of the separations. Thus there is a need for a method for determining good color separations when there are a large number of inks used.

Known methods for determining good color separations are often based on first measuring the colorimetric properties of patches of different amounts of a set of inks printed in sequence on top of each other. Modern color management techniques for obtaining color separations, such as COLORSYNC™ (Apple Computer, Inc., Cupertino, Calif.) and the methods promoted by the International Color Consortium (ICC, see http://www.color.org) are based on this. While these techniques can produce accurate results, and also work for halftone images, they are essentially limited to four ink systems. This is because of the large number of measurements of patches of combinations of more than 4 inks that would be needed. For example, the IT8.7.3 chart (American National Standards Institute [ANSI] Committee IT8 for Digital Data Exchange Standards) contains nearly a thousand patches for a four color output. Because of the large number of measurements, it is very difficult to characterize sets of more than four colorants, for example printing with six or seven colors, and as a consequence it is also difficult to make color separations for these printing systems based on their measured colorimetric properties. There also are applications where inks other than cyan, magenta, yellow and black need to be used, and it is not clear that prior art color management techniques that depend on measuring colorimetric properties of ink combinations work well for this. Thus there has been some effort to find better techniques applicable to more than four colorants or to different colorants.

U.S. Pat. No. 5,734,800 issued Mar. 31, 1988 to inventor Herbert, et al., titled *SIX-COLOR PROCESS SYSTEM* describes a system of five basic inks and a black ink. A "print grid" is printed and measured with a spectrophotometer, and a lookup table is created from this data and used to find the color separations for a specific color.

European Patent Publication EP 0586 139 A2 to inventor Litvak titled, *PRINTING APPARATUS AND METHOD FOR MORE THAN FIVE COLORS* describes a method for generating a print using CMYK and additional inks, such as RGB. The method is based on linear transformations of the input space, followed by non-linear corrections of the obtained CMYKRGB set and some user controlled color corrections. The Litvak method has a large number of parameters that need to be determined. Parameter values are provided in the patent for a CMYK RGB case. The parameter values depend on the particular CMYK inks being used, and, for example, different parameters would be needed for a CMYK OG case. The Litvak method appears to be an empirical method. It is not clear how to apply this method in general for generating color separations to any set of arbitrary selected inks.

U.S. Pat. No. 5,870,530 to Balasubramanian titled *SYSTEM FOR PRINTING COLOR IMAGES WITH EXTRA COLORANTS IN ADDITION TO PRIMARY COLORANTS*, issued Feb. 9, 1999, describes determining separations using what can be called a substitution method. A CMY to CMYKOGB example is described. The M and Y values are decreased gradually in a non-linear way and the appropriate O amount is added for colors that have an orange hue, again in a non-linear way. This apparently guarantees optimal smoothness of the separations. By using the non-linear substitution method, the possible gamut of obtainable colors is increased as compared to a simple linear substitution. While the Balasubramanian method improves on linear substitution, the gamut the method achieves is nevertheless smaller than the gamut of obtainable colors using the same ink set. For example, some saturated colors may never be obtained.

Harold Boll in "A Color to Colorant Transformation for a Seven Ink Process," Proceeding, IS&T's Third Technical Symposium on Proofing and Printing, pp. 31–35, 1993, has described a method applicable for CMYKRGB ink sets, such as the Küppers ink set. In the Boll method, the CMYKRGB ink set is sub-divided in six groups, each group containing black and three other inks. In CMY, each ink is complementary to the combination of the other two. In the Boll method groups, none of the three non-black inks is complementary to the other two. Combinations of the different sets of inks are printed and measured using a spectrophotometer. Using the Boll method leads to an ambiguity because colors can be made using more than one of the six-ink sub sets. The way this is solved is by using the ink set where the dominant primary is maximized.

U.S. Pat. No. 5,650,942 (issued Jul. 22, 1997) and U.S. Pat. No. 5,991,511 (issued Nov. 23, 1999) to inventor Granger titled *APPEARANCE-BASED TECHNIQUE FOR RENDERING COLORS ON AN OUTPUT DEVICE* describe a technique that uses an appearance color space, related to the CIE XYZ color space. The color space is called VTD herein, where T and D are chromaticity coordinates and V represents some monotonic function of luminance, say lightness. An "Umbrella Surface" is defined to be the gamut boundary surface that maximizes the V-value. One might also call the umbrella surface the "Lightness Gamut Boundary" (LGB) surface. Granger uses measurements to determine the VTD values of the LGB for some particular cases such as CMYK and CMYKOG. The Granger method next constructs the 3-D gamut using the LGB and a perfect black ink, which produces a perfect neutral gray along the V-axes. The Granger method avoids the need for constructing a 3-D table that describes the color gamut of the printer in 3-D; the method uses a 2-D table to determine the values of two of the primaries from the TD-coordinates (or actually from the T/V and D/V values), and uses the V values to determine the value for black. Thus, three-dimensional interpolation is avoided.

Apparently, the method uses the maximum real surface colors gamut, also called "Pointer's Gamut" (see M. R. Pointer, "The Gamut of Real Surface Colors," Color Research and Applications, vol. 5, no. 3, pp. 145–155, 1980) and maps this whole gamut onto the 3-D gamut constructed as described in the Granger patents.

The Granger method does not describe how to determine the umbrella surface for an arbitrary set of inks. Rather, it describes using measurements to determine the LGB for some particular cases. To be able to handle any arbitrary ink set, the number of measurements that need to be taken may be too large.

The Granger method further is restricted to the LGB surface. Sometimes another criterion is desirable. For example, if the set of inks includes two cyans, two magentas, a yellow and a black, with the chroma of the two cyans and the two magentas being more important than their lightness, then a non LGB criterion may be desirable. Furthermore, for some ink sets, the LGB may sometimes not be very smooth or continuous in terms of the ink percentages that are used to construct the surface. Thus, for these and other reasons, the Granger method may not be suitable for an arbitrary ink set.

The Granger method uses the lightest color, and does not use what can be called the "most saturated" colors of the umbrella in which one of the inks is set to 100% and two other inks are varied. This part of the umbrella may be particularly difficult to construct, so there is a need for a method that can construct it. It may be that the surfaces fold. See M. Mahy and P. Delabastita, "Inversion of the Neugebauer Equations," Color Research And Applications, vol. 21, no. 6, pp. 365–374, 1996, and M. Mahy, "Calculation of Color Gamuts Based on the Neugebauer Model," Color Research and Applications, vol. 22, no. 6, pp. 404–411, 1997. If there is folding then only some of the most saturated colors surface belongs to the umbrella surface, since part of the curved surface curves underneath itself, i.e., folds.

The inventor believes that the Granger method maps the entire Pointer's gamut onto the device gamut in the VTD space. The Granger method furthermore needs a neutral black production, either through a real neutral black ink or by adding one or more complementary primaries that produce a neutral black. If the darkening ink does not produce straight lines in the VTD space, the color of the separated image may become significantly different from the color in the original image.

Thus, methods known in the prior art still have one or more shortcomings and there still is a need for a separation method and apparatus for an arbitrary number of arbitrary inks that overcome one or more of the shortcomings in the prior art, and in particular, the shortcomings of the Granger Method.

SUMMARY OF THE INVENTION

Described herein is a separation method that overcomes one or more of the above-stated shortcomings of the prior art. One aspect of the invention provides a general separation method for any set of inks. According to one feature, the inventive separation method does not need extensive measurements of combinations of the inks of the printer.

In yet another aspect of the invention, a sub-gamut of a multi-ink printer is determined that is characterized by a surface, which smoothly varies with ink concentration. This sub-gamut may be smaller than the full color gamut of the printer.

In yet another aspect of the invention, this sub-gamut is used to determine ink combinations that produce colors that are inside the sub-gamut.

In yet another aspect of the invention, a separation method is provided according to which the color of separations is related to the required input color through some CIE related color space.

In yet another aspect of the invention, an apparatus for obtaining a multi dimensional separated image is described.

DETAILED DESCRIPTION

Figure 1:
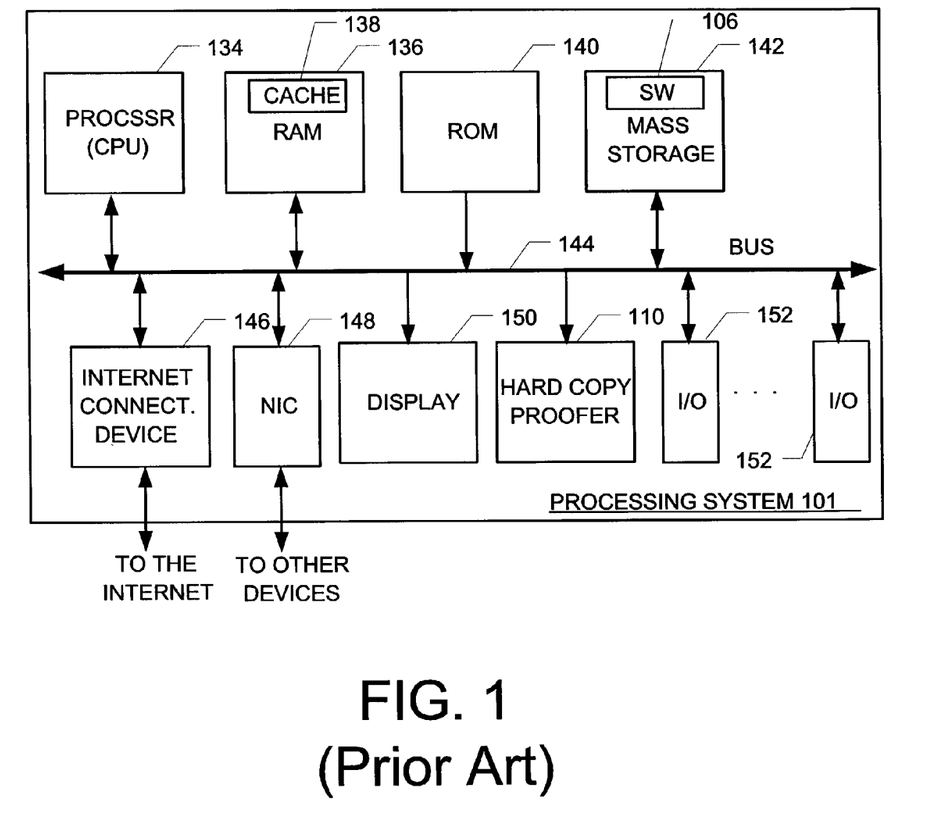
FIG. 1 is a simplified block diagram of a processing (computer) system 101 in which the present invention may be embodied.

FIG. 1 is a simplified block diagram of a computer system 101 in which the present invention may be embodied. Versions of the present invention are embodied in a general-purpose computer system such as shown in FIG. 1, and the remaining description will generally assume that environment. However, the invention may be embodied in dedicated devices such as printer servers, and printer controllers. A computer system configuration such as that of FIG. 1 is standard, and as such, FIG. 1 is labeled "Prior Art." A computer system such as system 101, suitably programmed to embody the present invention, however, is not prior art.

In accordance with known practice, the computer system includes one or more processors 134 that communicate(s) with a number of peripheral devices via a bus subsystem 144. These peripheral devices typically include a memory subsystem 136 shown comprising RAM and a cache 138, a user input facility (one of input devices 152), a display subsystem 150, output devices such as a printer 110, and a file storage (mass storage) system 142.

In this context, the term "bus subsystem" is used generically to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display do not need to be at the same location as the processor, although it is anticipated that the present invention will most often be implemented in the context of personal computers (PCs) and workstations.

Memory subsystem 136 includes a number of memories including a main random access memory ("RAM"). It may also include read only memory ("ROM") in which fixed instructions are stored. In the case of Macintosh-compatible personal computers this would include portions of the operating system; in the case of IBM-compatible personal computers, this would include the BIOS.

I/0 devices 152 may include a keyboard and may further include a pointing device and a scanner. The pointing device may be an indirect pointing device such as a mouse, trackball, touchpad, or graphics tablet, or a direct pointing device such as a touchscreen incorporated into the display.

Display subsystem 150 typically includes a display controller and a display device coupled to the controller. The display device may be a cathode ray tube ("CRT"), a flat-panel device such as a liquid crystal display ("LCD"), or a projection device. Display controller provides control signals to display device and normally includes a display memory (not shown in the figure) for storing the pixels that appear on the display device.

The file storage system provides persistent (non-volatile) storage for program files 142 and data files, and typically includes at least one hard disk drive. There may also be other devices such as a floppy disk drive, a CD-ROM drive and optical drives. Additionally, the system may include hard drives of the type with removable media cartridges. As noted above, one or more of the drives may be located at a remote location, such as in a server on a local area network or at a site on the Internet's World Wide Web.

In one embodiment, the input image is provided in a color space called the first color space herein. For example, the first color space may be RGB from a scanner device.

Consider a set of a number—denoted N—of colorants such as inks, denoted $I_1, I_2, I_3, \ldots, I_N$, respectively. Denote the area coverage percentages of the N inks by $p_1, p_2, p_3, \ldots, p_N$, respectively, and consider a color reproduction process such as a printing process wherein each of the coverage percentages can be varied independently. The set of N colorants and the color reproduction process that uses these colorants for reproduction form a color space, which is called the "second color space" herein.

One aspect of the invention is providing a mapping between the first color space and the second color space of the colorants such as printing inks, i.e., providing a method and apparatus for color separating the input image, including converting each color in the image from the first color space to the second color space. Part of that method is determining the output color gamut. In one embodiment, that output gamut is determined in a device independent color space, called the second color space herein.

Figure 7:
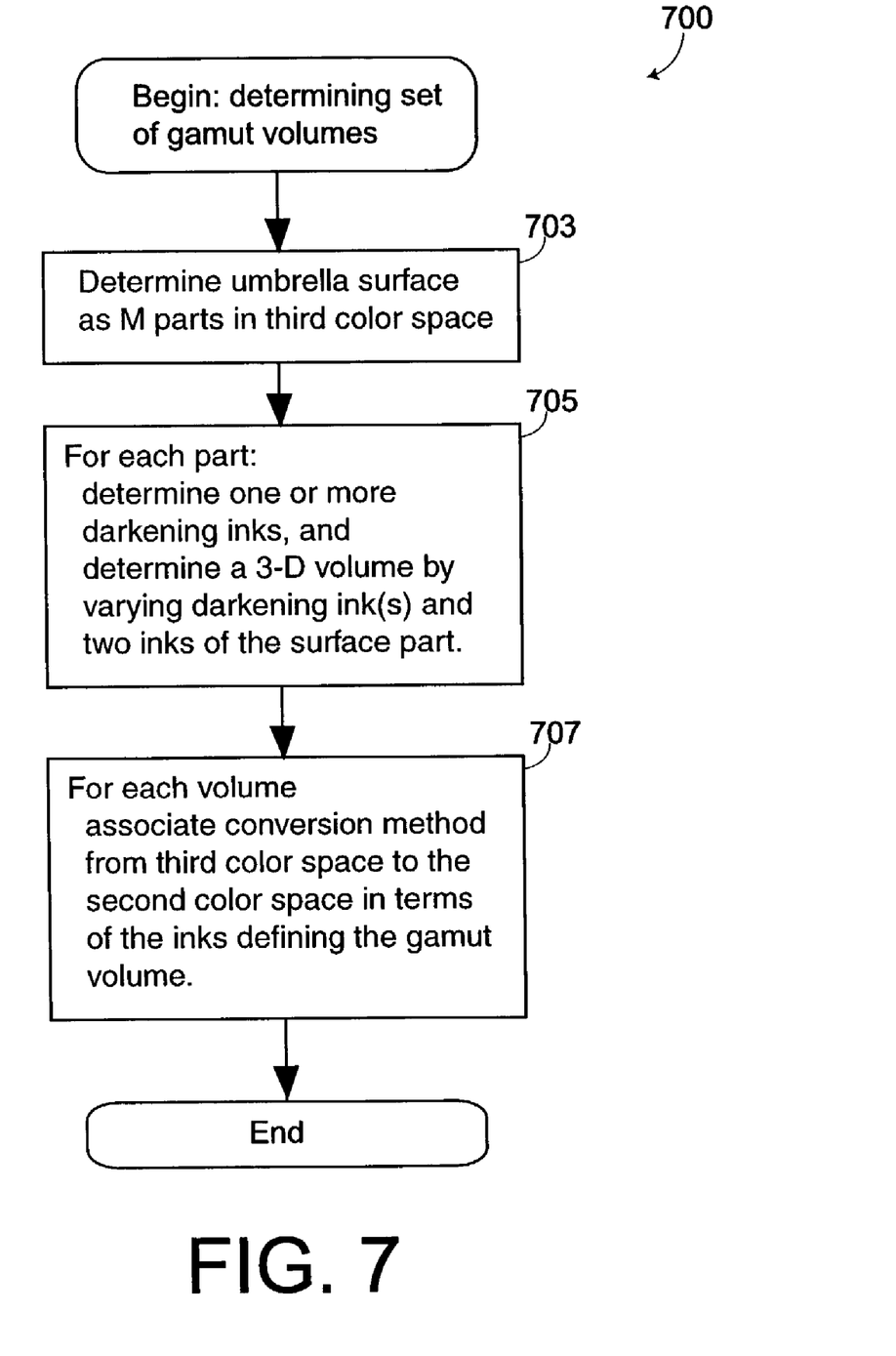
FIG. 7 shows a flow chart of a method for constructing a set of M gamut volumes according to an embodiment of the invention.

FIG. 7 shows a flow chart of one embodiment of a method for determining the output color gamut in the second color space. The method includes in step 703 determining an umbrella surface that includes one or more parts, in general M parts, each defined by varying two of the N-inks while keeping the other N-2 inks constant. For each part of the umbrella surface, the method further includes (step 705) determining at least one darkening inks of the set of N-inks. One embodiment determines one or two darkening inks. For each part of the umbrella, the two varying inks and varying amounts of the darkening inks are used to determine a gamut volume. Thus, the color output gamut is determined as a set of M gamut volumes in the third color space.

For each part of volume of the set of gamut volumes, the method includes in step 707 associating a conversion method from the third color space to the second color space in terms of the coordinates of the third color space that define the gamut volume.

The steps for determining the umbrella surface are now described in more detail with reference to FIG. 8 that shows a flow chart of one embodiment of determining an umbrella surface (step 703 of FIG. 7).

The umbrella determining method includes determining the color of a set of inks. U.S. Pat. No. 5,933,578 issued Aug. 3, 1999 and U.S. patent application Ser. No. 09/361,435 filed Jul. 26, 1999, both to Van de Capelle, et at, both titled METHOD AND DEVICE FOR DETERMINING THE COLOR APPEARANCE OF COLOR OVERPRINTS, and both hereby incorporated herein by reference, describe how to determine a set of colorant parameters for a set of the inks printed in sequence one over the other. The colorant parameters in turn provide for determining the color, e.g., in the form of a reflectance spectrum of an overprint of the inks each ink printed at a certain coverage percentage. The spectrum in turn can be used to convert to any color space, e.g., the third color space. Incorporated herein by reference U.S. Pat. No. 5,933,578 and patent application Ser. No. 09/361,435 are hereinafter together called Our Ink Patents.

By being able to calculate the color of an overprint of a set of inks, it is also possible to determine which set of inks printed at what area coverage percentages will produce a desired color. There may however be ambiguity; i.e., there may be many possible ink combinations that can produce a given color. A printer, however, may not consider all of these combinations as desirable. There is therefore a need for a method to resolve this ambiguity, and one aspect of the invention is resolving this ambiguity by selecting which inks and in what coverage percentages to use to print which color.

The colorant parameters of Our Ink Patents provide for determining the color e.g., the reflection spectrum of an overprint of the inks, with each ink printed at a certain coverage percentage. The spectrum in turn provides for determining the color of the overprint of the inks in any device independent color space, such as CIE Lab, CIECAM97s, CIE xyY or any other color space. The color space into which the determined spectrum is converted is the "third color space" in which the set of gamuts is defined (FIG. 7). In one embodiment, this is the CIE Lab color space.

Consider the N colorants $I_1, I_2, I_3, \ldots, I_N$, respectively, and consider the second color space that these inks define when used with a particular printing process. This second color space spans a volume in the third color space (CIE Lab). When all inks but two in the original N-colorant color space are kept constant, varying the two inks defines a surface in the 3-D CIE Lab space. The boundary of the gamut is describable in terms of such third-color-space surfaces or parts of such surfaces.

U.S. Pat. No. 5,650,942 (issued Jul. 22, 1997) and U.S. Pat. No. 5,991,511 (issued Nov. 23, 1999) to inventor Granger, both titled *APPEARANCE-BASED TECHNIQUE FOR RENDERING COLORS ON AN OUTPUT DEVICE* describe a color space, called VTD, and also describe looking for the gamut boundary that has maximum L-value. The Granger method looks at all possible surfaces that can contribute, i.e., have parts that can be part of the gamut boundary.

As described in the Granger patents, the maximum lightness line represents the lightest colors (maximum value of Granger's V) that a target printer is capable of rendering for the given values of chroma. The maximum lightness line necessarily extends downwardly from no chroma since a given color is rendered by placing ink on the substrate, thereby reducing the amount of reflected light. The surface defined by the maximum lightness line and corresponding lines in other hue planes about the V axis is referred to by Granger as the umbrella surface, and colors on the umbrella surface are referred to as umbrella colors or surface colors. An umbrella color is, by definition, devoid of a neutral component, and thus, Granger asserts, is renderable by a single primary colorant or a combination of a pair of adjacent primary colorants.

One embodiment of the present invention also looks for the gamut boundary surface that has maximum lightness (L) value, and in particular looks at all possible surfaces—albeit in the third color space—part of which form part of the gamut boundary surface. U.S. Pat. Nos. 5,650,942 and 5,991,511 are hereby incorporated herein by reference and referred to as the Granger patents. An umbrella surface is then determined. However, the umbrella surface determined here is not necessarily the same as the Granger umbrella surface.

Figure 8:
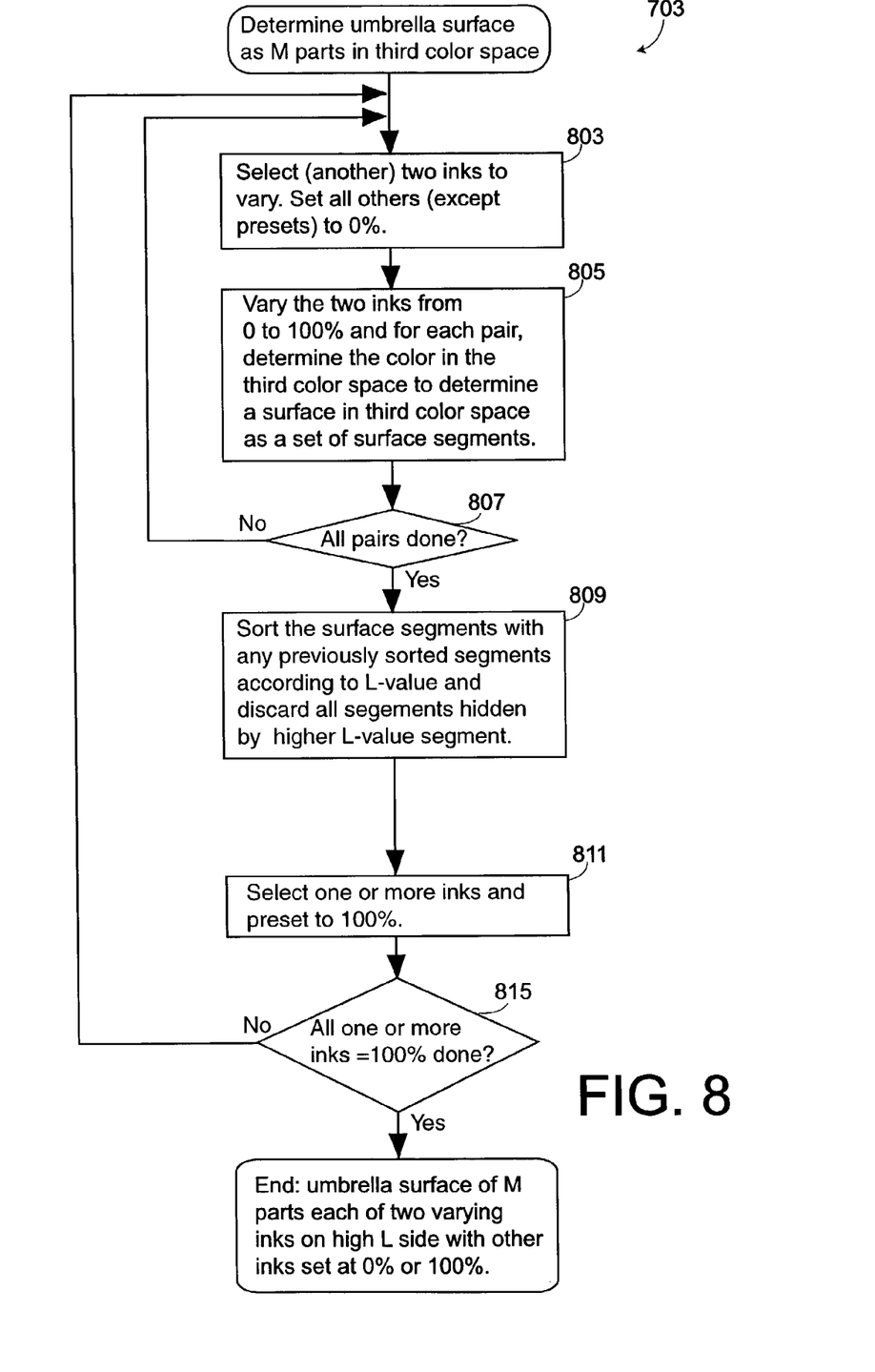
FIG. 8 shows a flow chart of a method for constructing an umbrella surface according to an embodiment of the invention.

Referring now to FIG. 8, to determine the set of surfaces that contribute to the gamut boundary, first select any two inks from the set of N inks (step 803). For the purpose of this description, denote the two inks as $I_j$ and $I_k$. Set all other inks to 0% coverage. Therefore, for example, if $I_j=I_k=0\%$, the color is white indicated by Lab=(100, 0, 0), where the lowest L value is 0 and the highest 100. In later repetitions of this step, some of the inks may be preset, and those presets are not set to 0% in step 803.

In step 805, the $p_j$ and $P_k$, the coverage percentages, respectively, of $I_j$ and $I_k$ ($I_j \neq I_k$), are varied to define a surface in the third color space, e.g., CIE Lab space. This surface in one embodiment is represented in the computer by a set of relatively small segments. In a particular implementation, the segments are planar triangles.

It is known that some inks cannot be "mixed" with each other because they do not print on top of each other. This might be the case, for example, if the inks do not adhere to each other, or if the ink mixture might have an undesirable reaction, such as becoming explosive as could happen with inks used in ceramics printing. It would be clear that such combinations should be avoided, and such avoiding may restrict the color gamut of the set of inks being printed. In one embodiment of steps 803 and 805, if the $I_j$ and $I_k$ are inks that are not combinable, e.g., inks that are printed one directly on top of the other, i.e., $i=j\pm 1$, and not combinable, then such combinations are selected in step 803 and used in step 805. A database of non-combinable ink pairs is maintained and checked prior to the calculation of the colors in CIE Lab space, and such calculation is avoided for non-combinable pairs.

In one embodiment, $p_j$ and $p_k$ are discretized. Two consecutive values of each of $p_j$ and $p_k$ form the vertices of two triangular planes in the CIE Lab space. The color of each $p_j$ and $p_k$ combination is determined using Our Ink Patents to determine the reflection spectrum of an overprint of the inks, and then to determining the color in the third color space. How to determine the color in a device independent space such as CIE Lab from a reflection spectrum is well known. Thus a set of triangles forming a surface in the CIE Lab space is determined by varying both $p_j$ and $p_k$ between 0 and 100%.

Figure 6:
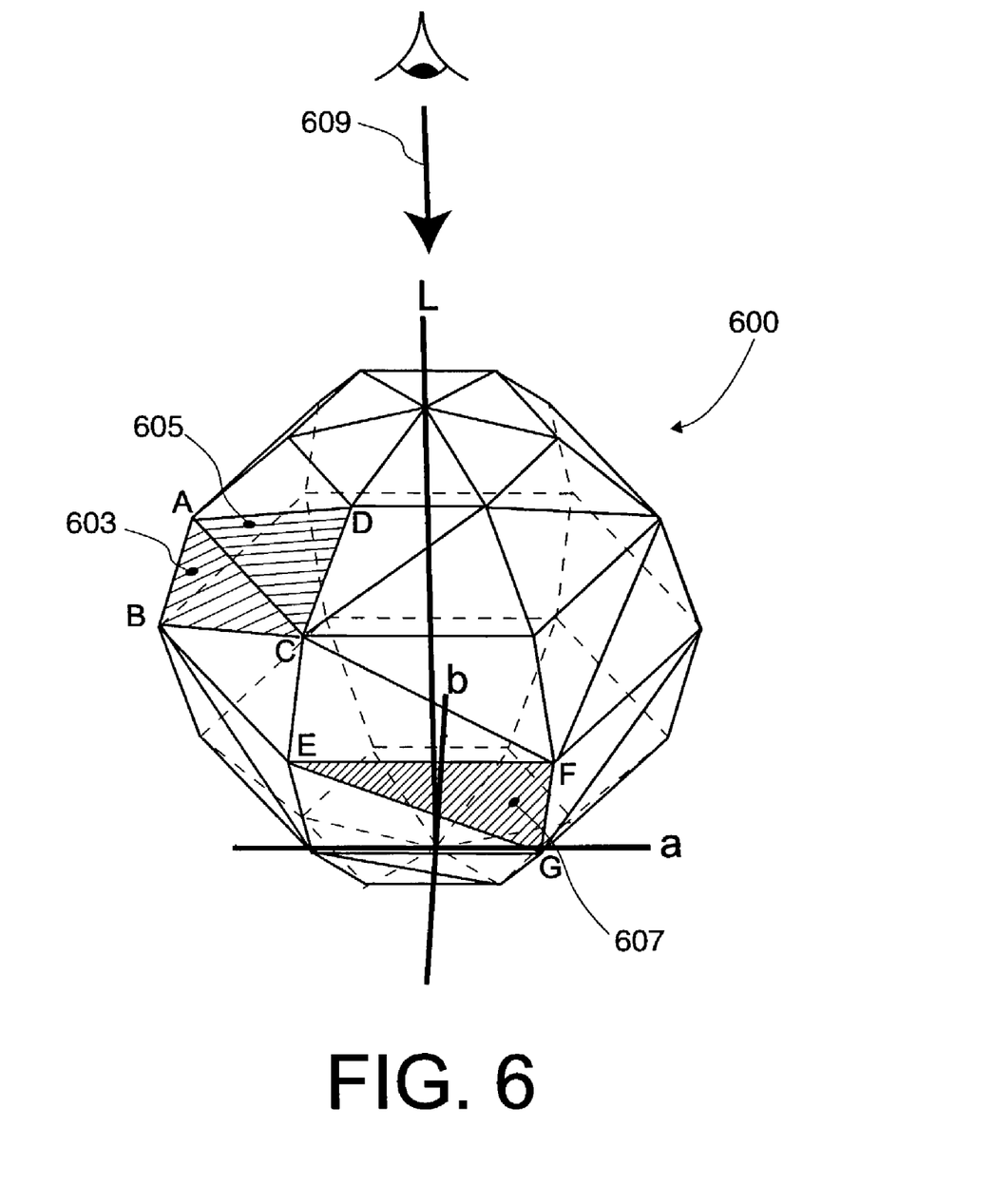
FIG. 6 shows a fictitious gamut in CIE Lab space and illustrated in exaggerated form representing a surface—in this case the gamut boundary surface—as a set of triangular segments.

FIG. 6 shows a fictitious gamut 600 in CIE Lab space and illustrated in exaggerated form representing a surface—in this case the gamut boundary surface—as a set of triangular segments. In this exaggerated version, suppose A, B, C, and D present the CIE Lab values that are obtained for two pairs of consecutive coverage area values of a pair of inks. The points A, B, C, and D are thus on a surface. According to one embodiment, this surface segment is approximated by the two planar triangles ABC (shown as 603) and ADC (shown as 605).

One embodiment of the method described in Our Ink Patent includes determining a set of colorant parameters for the N inks that can be used describe the color of an overprint on a substrate. Using the colorant parameters, the spectrum of the overprint is determined using an equation that determines the spectrum in term of the coverage percentages, the inks' colorant parameters, and the characteristics of the substrate. From the spectrum, the resulting CIE Lab colors are then determined.

One method embodiment of the invention further includes repeating the obtaining of the surface in the CIE Lab space by selecting another pair of inks. This is shown in FIG. 7 as step 809 of checking if all pairs have been done. If not, steps 803 and 805 are repeated, with step 803 selecting a different pair of inks. Steps 803–805 are thus repeated for all ink pairs, i.e., for all other integers j and k between 1 and N, j≠k to define a set of surfaces.

In step 809, from the set of surfaces, i.e., the sets of triangles, only those triangles that are candidates for belong to the gamut boundary surface at the high L side are kept. All others are discarded. That is, the surfaces are sorted according to L value in the third space, and the surfaces or segments of the surfaces, e.g., the triangular planar surfaces that do not belong to the gamut boundary at the high L-side are discarded. One method uses "hidden surface" removal methods well known in the field of computer graphics. If one considers the L-axis as the depth (z) axis in three-dimensional (x-y-z) visualization, then when viewing the surfaces from L=infintiy, only those surfaces not hidden by surfaces, e.g., planar triangles that have a higher z value are kept and all others are discarded. Thus none or more triangular segments from each surface are maintained as candidates for belonging to the gamut boundary surface at the high L side.

Referring again to FIG. 6 that shows a fictional gamut with the gamut boundary discretized in an exaggerated manner, triangular element 607 (vertices EFG) would be hidden when viewed from the L-axis (direction 609). Thus, in the sorting step 809, element 609 would eliminated in this fictional simplified example.

In the sorting, one embodiment also incorporates the findings of M. Mahy and P. Delabastita, "Inversion of the Neugebauer Equations," Color Research And Applications, vol. 21, no. 6, pp. 365–374, 1996, and M. Mahy, "Calculation of Color Gamuts Based on the Neugebauer Model," Color Research and Applications, vol. 22, no. 6, pp. 404–411, 1997, both incorporated herein by reference, that the surfaces may fold. If there is folding, only those surface segments that are not in a fold, i.e., that do not in the underneath part of a fold are used as possible candidates for the gamut boundary at the high-L end.

In step 811, one ink, say $I_m$, is selected and preset to 100% area coverage. With the remaining set of N-1 inks, the same steps 803–809 are repeated to obtain several surfaces. These surfaces are sorted in step 809 according to lightness together with those already candidates to further discard surface segments that cannot be part of the gamut boundary at the high-L end.

Steps 803–811 are for all possible single inks preset at 100% in step 811, i.e., different values of m. In each case, for the remaining N-1 inks, the sorting includes the previous surviving candidates and, by discarding the surfaces or segments of surfaces that cannot belong to the gamut boundary at the "high" L-side, an updated set of surface candidates is obtained.

Steps 803–811 are repeated for all possible pair of inks preset at 100% in step 811. Then steps 803–811 are repeated for all possible three of the inks preset at 100% in step 811, and so forth, until N-2 inks are preset at 100%. Step 815 determines if all sets of one or more inks, up to and including N-2 inks have been preset to 100%. In each repetition, the sorting step 807 includes the previous remaining candidates. At the end of the process, the remaining surfaces or surface segments form gamut boundary surface at the high L side that includes a number, denoted M, of parts. Each part has two of the N inks of the third color space varying, and the remaining N-2 inks set at either 0% or 100%. Thus is the umbrella surface in the third color space (CIE Lab in one embodiment).

The set of surface segments that form this gamut boundary at the high end—the umbrella surface—vary smoothly in CIE Lab space as well as in the second color space and are on the "high" L-side. The surfaces do not necessarily construct the actual true gamut boundary on the high L-side, i.e., the boundary of the gamut achievable in CIE Lab, but do form a continuous set of surfaces in CIE Lab space (third space) and in the second space. While the surface formed by the set is called the "umbrella surface" herein, it should be noted that this is typically but not necessarily different from Granger's umbrella surface. In many cases, it includes more of the gamut than Granger's umbrella surface.

Figure 2:
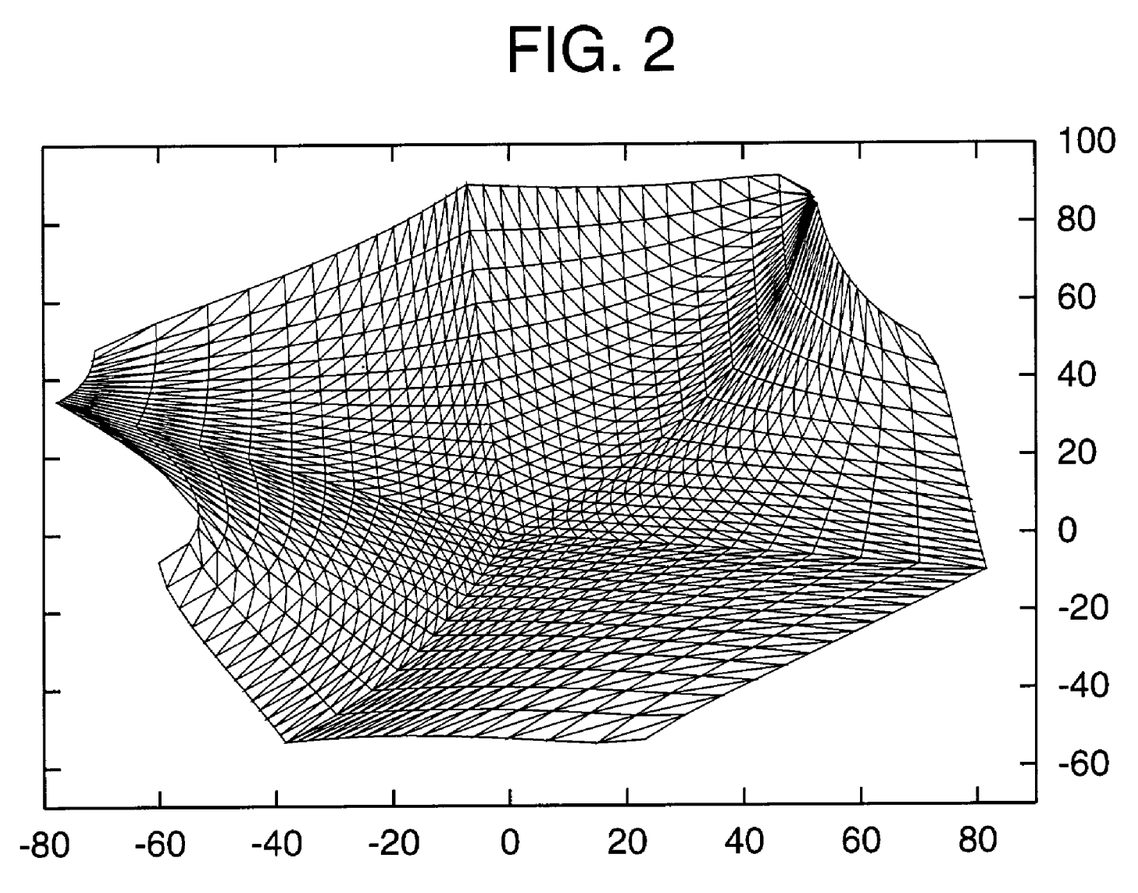
FIG. 2 shows an umbrella top surface in CIE Lab space, viewed from the top, this is in the ab plane. For PANTONE's Hexachrome printing process CMYK OG. The top surface includes 5 parts (Y-O, Y-G, M-O, C-G, C-M).

FIG. 2 shows an umbrella surface in CIE Lab space constructed using the method described above, viewed from the top, so this is a projection in the ab plane as viewed, for example, in directional 609 shown in FIG. 6, for the PANTONE Hexachrome® printing process CMYK OG. This umbrella surface includes 5 parts: Y-O, Y-G, M-O, C-G, and C-M.

Figure 3:
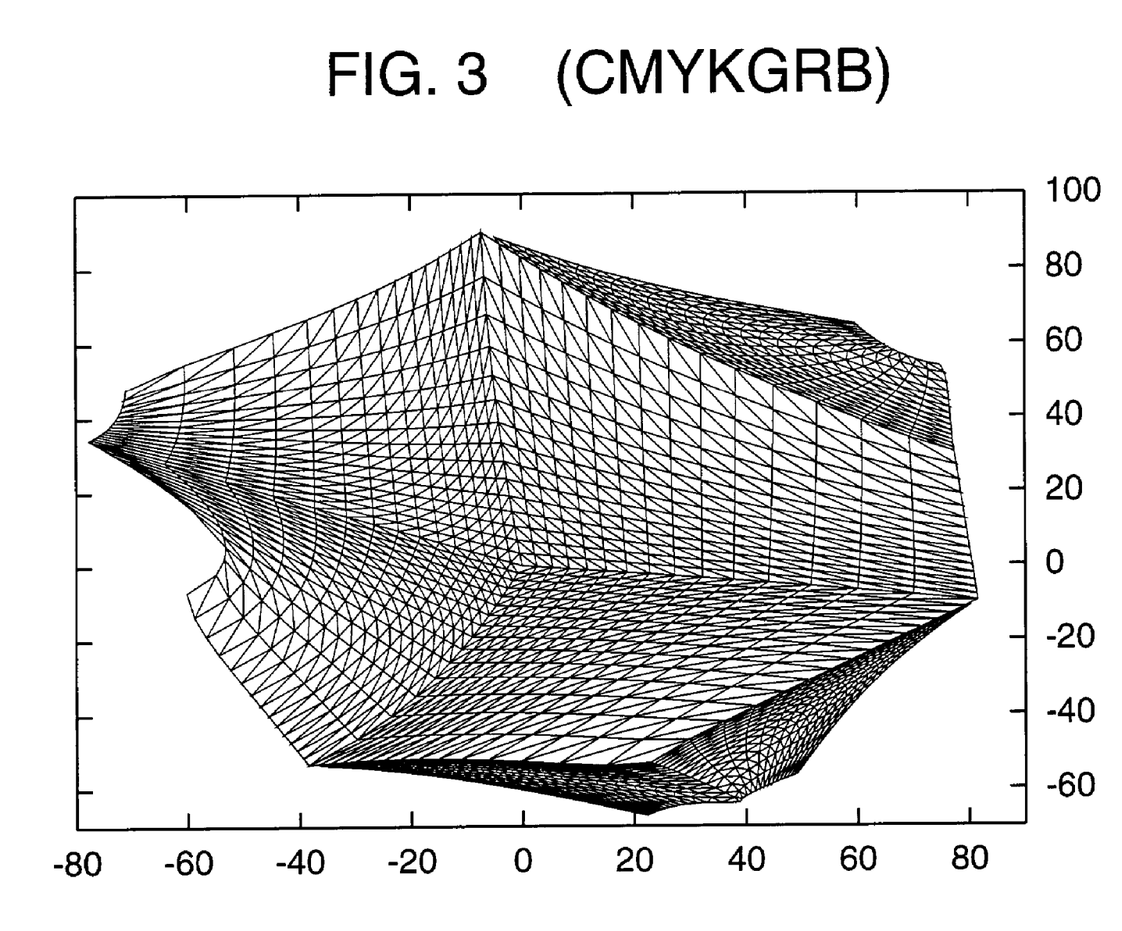
FIG. 3 shows the umbrella surface for process CMYK complemented with PANTONE 485, PANTONE Hexachrome Green and PANTONE BLUE 072. This umbrella surface includes 7 parts.

FIG. 3 shows the umbrella surface in CIE Lab space constructed using the method described above, viewed from the top, for process CMYK complemented with PANTONE 485, PANTONE Hexachrome Green and PANTONE BLUE 072. This umbrella surface includes 7 parts each of two inks varying.

Figure 4:
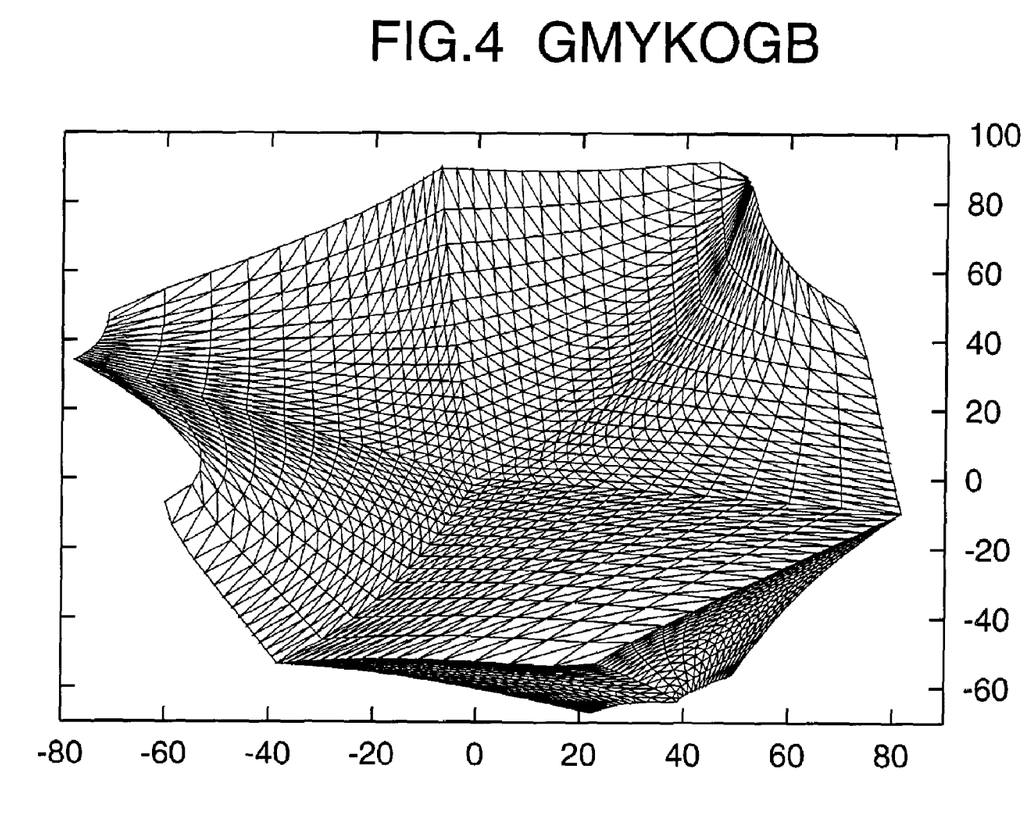
FIG. 4 shows the umbrella surface for the combination of PANTONE's Hexachrome inks with the addition of PANTONE Blue 072 ink.

FIG. 4 shows the umbrella surface in CIE Lab space constructed using the method described above, viewed from the top, for the combination of the PANTONE Hexachrome® inks complemented with PANTONE BLUE 072. Again this umbrella surface includes 7 parts.

Returning back to FIG. 7, some of these steps are now described in more detail. Once the umbrella surface is constructed, in step 705, one or more inks that can darken the colors on the umbrella surface are determined. In accordance with one embodiment, for each part of the umbrella surface one such darkening ink is sought, and in another embodiment, two such darkening inks are sought. The one ink may be a real black ink. In the second embodiment, the two inks can be a real black and an ink complementary to the part of the umbrella surface being considered for darkening.

Once the darkening inks are determined, for each part of the umbrella surface, in step 705 a 3-D gamut volume is constructed by varying of the three inks—the two that vary on the umbrella surface part plus one darkening ink if one darkening ink—or four inks—the two varying inks and the two darkening inks—while the remaining inks are kept constant. To determine the volume one embodiment used a color separation technique for converting form a space such as third color space into a 3 or 4 ink color system. Many such separations techniques are in the prior art. U.S. Pat. No. 5,689,349 (issued Nov. 18, 1997) to inventors Plettinck, et al., titled *METHOD AND DEVICE FOR GENERATING PRINTING DATA IN A COLOR SPACE DEFINED FOR NON-STANDARD PRINTING INKS* describes a method—hereinafter "the Plettinck Color Conversion Method"—to transform a set of colors specified in one set of inks, e.g., a first CMYK set to the corresponding set of colors specified in a different set of inks, e.g., so-called special inks, while preserving color appearance. U.S. Pat. No. 5,689,349 is hereby incorporated herein by reference. The Plettinck Color Conversion Method for example can be used to transform each pixel of an original image, specified with a first set of colorants, denoted say as CMYK colorants, to a corresponding pixel specified with a different set of colorants, denoted by C'M'Y'K' colorants. The Plettinck Color Conversion Method includes determining a color specified with the CMYK colorant set in a first device independent color space. Next this color is transformed to a second device independent color space, this transformation including gamut mapping. Next an estimation of the coverage percentages of the C'M'Y'K' colorants is obtained that produce the color in the second device independent color space. This estimation is subsequently refined until the coverage percentages C'M'Y'K' are obtained that reproduce the color in the second colorant space.

One embodiment of the present invention uses the Plettinck Color Conversion Method in step 705. For each part of the umbrella surface, a 3-D gamut volume is constructed by varying the two inks that are varied for that part of the umbrella surface and the one or two darkening inks, while the remaining inks of the set of N are kept constant at 0% or 100%, depending on the ink and the surface part. That is, for any part of the umbrella surface, for each point (corresponding to some value of two inks), the amount of each darkening ink is varied, and the resulting CIE Lab value determined, e.g., using the Plettinck Color Conversion Method. When used as part of the inventive method, in one embodiment, the modified (C'M'Y'K') color space is determined in such a way that the color gamut is slightly larger than the color gamut of the CMYK colorants. The gamut-mapping step can then be discarded.

One aspect of the invention is separating an image provided in the first color space into an image in the second color space, i.e., performing color separation into separations for the N-inks $I_1, I_2, \ldots, I_N$.

Consider a color, e.g., of an image pixel to be separated from the first color space, e.g., RGB, into the color space formed by the N-ink set. One embodiment determined whether the color is inside one of the 3-D gamut volumes in the third color space, or if gamut mapping is to be used, to be gamut mapped into the volume. That is, which of the set of M gamut volumes defined in the third color space is appropriate for the color. This determining may be carried out, for example, by transforming to the third color space and determining which volume the color is transformed to, or close to if gamut mapping is included. A separation technique for this gamut volume is now applied to the color in the volume. Each volume is constructed of either three colors (two inks and one darkening ink) or four colors (two darkening inks). A transformation (separation) to these three or four colors is straightforward. Many suitable separation techniques are known. One embodiment uses the method described in U.S. Pat. No. 5,268,754 (issued Dec. 7, 1993) to inventors Van de Capelle, et al., titled *METHOD AND A DEVICE FOR CONVERTING A COLOR COORDINATE SET*, and another uses the method described in above mentioned U.S. Pat. No. 5,689,349. U.S. Pat. Nos. 5,268, 754 and 5,689,349 are both incorporated herein by reference. Step 705 associates for each of the volumes a conversion method from the third color space to the second color space.

For the case of the volumes overlapping, which can happen for example if different darkening inks are used for different parts of the umbrella surface, embodiments of the invention include making a selection of which 3-D volume to use for a color in the overlap. The selecting is carried out according to a criterion. In one embodiment, using the criterion includes determining how close the color for conversion is to the gamut boundary and using the volume wherein the color is furthest from its boundary. Alternate embodiments use one or another different criterion.

According to yet another alternate embodiment, each of the 3-D color volumes is reduced such that there are no intersecting parts of the volumes. This eliminates the step of selecting which volume to use.

In some embodiments, the color conversion methods associated with each gamut volume in step 705 includes a lookup table and multi-dimensional interpolation. In one embodiment, a different lookup table and interpolation method pair is associated with each of the 3-D gamut volumes. Thus, which combination of a lookup table and interpolation method is used depends on where the color is in the color space.

In an alternate embodiment, one lookup table and interpolation method pair is used for all the volumes to transform the first color space colors, e.g., RGB to the inks that form the second color space. One potential problem with such an alternate embodiment is the presence of some undesirable "inter volume contamination" that may lead to more inks being printed for a given color.

Figure 9:
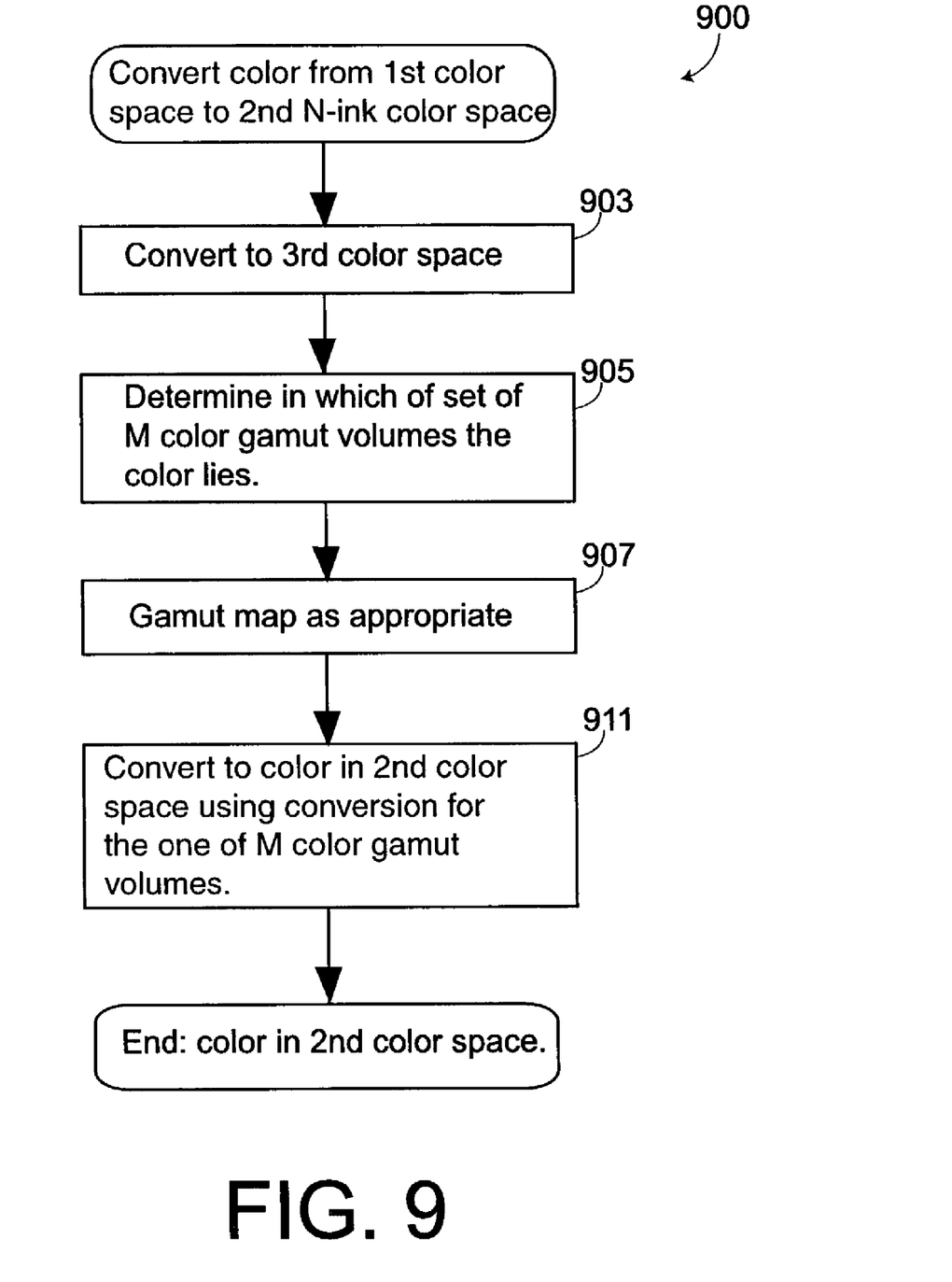
FIG. 9 shows a flow chart of a method for converting a color from a first color space to a second color space of N printing inks.

When an input image is presented to be separated into the N-dimensional color space, the image itself being defined in a first color space, e.g., RGB, an embodiment to obtain the separated image is proceeds as shown in FIG. 9 that shows a flowchart for converting a color in the first color space into the matching color in the second color space. Each of the steps is carried out for each pixel of the image. In step 903, the color is transformed into the third color space, e.g., the CIE Lab space. One embodiment uses the colorant parameters described in Our Ink Patents. Alternate embodiments use other technique for the conversion from the first the third color space in which the gamut is defined.

The colors of each pixel in this third color space are subsequently changed (mapped) in this third color space, such that one obtains a set of second colors in the third color space. This is generally designated as gamut mapping. See J. Morovic, M. R. Luo "Developing Algorithms for universal colour gamut mapping," in *Color Imaging Vision and Technology*, New York: Wiley, 1999. The gamut mapping can be steered by the gamuts of the first and the second color space, as described in J. P. Van de Capelle, "Trade-offs between fundamental and pragmatic colour management systems," Proceedings, Colour Image Science 2000, Derby, UK, pp. 127–136, April 2000, incorporated herein by reference. In one embodiment, the gamut mapping is into one of the set of M color gamut volumes, and thus in step 905, into which of the M-volumes the color is to be mapped is determined. The gamut mapping is shown as step 907.

In one embodiment, for each of these second colors, the conversion to amounts of the N-primaries of the second color space are determined, as described above, by determining which of the volumes the color belongs to (step 905), and then separating into the color (step 911). In one embodiment, the conversion method associated with each of the volumes is used in step 911 for the color according to the gamut volume the color is in.

Figure 5:
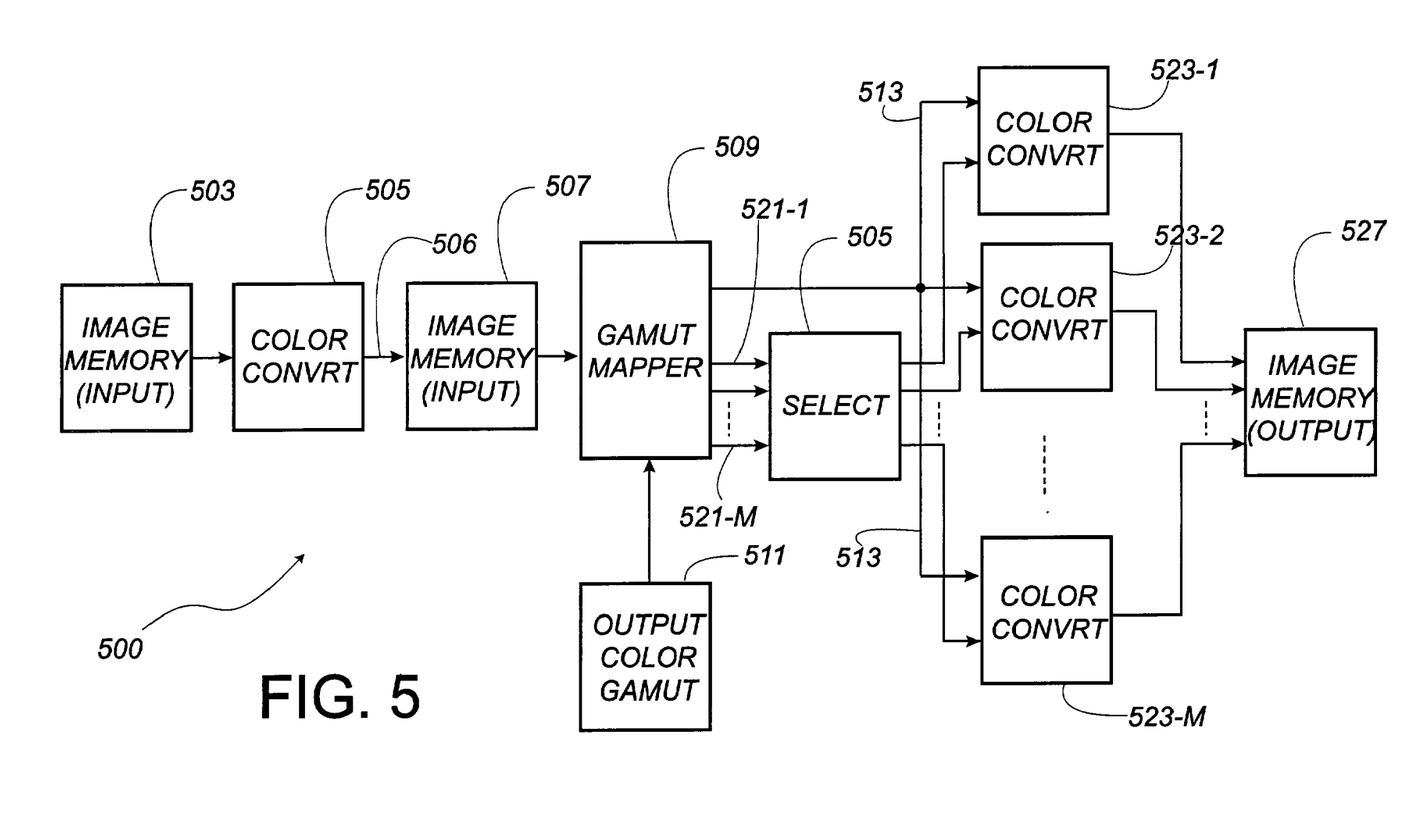
FIG. 5 shows a simplified block diagram of a device that is used to re-separate an image into a multi primary (multi ink) color space according to an aspect of the invention.

Another aspect of the invention is an apparatus for converting the pixels of an image from a first color space to a third color space. FIG. 5 shows a simplified block diagram of an apparatus 500 to so convert an image into a multi primary (multi ink) color space.

The device includes an input image memory 503 where an input image is stored, and a first color converter 505 that transforms the image in memory 503, into an image 506 defined in the third color space. The image 506 in the third color space is stored in an intermediate image memory 507.

How to make such color converters is generally known to those in the art (see the above description for known methods). A hardware device that is suitable for use as converter 505 is, for example, described in Our Ink Patents (U.S. Pat. No. 5,933,578 and U.S. patent application Ser. No. 09/361,435) and also in U.S. Pat. No. 5,268,754. Unit 509 performs gamut mapping and receives the transformed image 506, stored in the memory unit 507. The gamut mapper 509 also has as input the gamut of the output device that uses the second color space. This output device gamut may be described as a set of one or more 3-D volumes defined in the third color space for the output device, as constructed with the method described above. The data is pre-stored in a memory 511. The output 513 is the image after gamut mapping.

The units 523-1, 523-2, ..., 523-M form a set of M color converter units that each separates the image 513 (after gamut mapping) into 3 or 4 inks, depending on the number of darkening inks. How to make such color converters is generally known to those in the art. Each such color converter units for example may be as described in U.S. Pat. No. 5,689,349 (the Plettinck Color Conversion Method). The gamut mapper 509 also includes one or more outputs that provide an indication of which of the units 523-1, 523-2, ..., 523-M is best suited for separating the color at hand. In the embodiment of FIG. 5, gamut mapper 509 includes outputs 521-1, 521-2, ..., 521-M. Each such output may be an out of gamut indication, saying the color is not within the gamut of the corresponding 3-D volume of the set 523 of color converters, and by how far it is out (e.g., in delta E units). The M outputs of the set of color converters are fed to a selector 525 that has M "select" outputs, one input to each of the color converters 523-1, 523-2, ..., 523-M. Selector 525 asserts one of its outputs. Each color converter outputs only when its "select" input is asserted. Thus selector 525 activates only one of the color converters, and the output of that color converter defines the color in the second color space. The outputs of all the color converters 523-1, 523-2, ..., 523-M are coupled to an image memory 527, so that the color in the second color space is stored in memory 527.

As will be appreciated by those skilled in the art, embodiments of the present invention may be embodied as a method, an apparatus such as a special purpose apparatus, an apparatus such as a data processing system, or a carrier medium, e.g., a computer program product, carrying one or more computer readable code segments for controlling a processing system to carry out a set of steps. Accordingly, the present invention may take the form of an entirely hardware embodiment, an entirely software embodiment or an embodiment combining software and hardware aspects. Furthermore, the present invention may take the form of a carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods and flowcharts discussed are performed in one embodiment by an appropriate one or more processors of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

The instructions (e.g., computer readable code segments in storage) may be read from storage into memory. Execution of sequences of instructions contained in memory causes one or more processors to perform the process steps described herein. In alternative embodiments, hard-wired circuitry may be used in place of or in combination with software instructions to implement the invention. Thus, embodiments of the invention are not limited to any specific combination of hardware circuitry and software.

The terms "carrier medium" and "computer-readable medium" as used herein refer to any medium that participates in providing instructions to a processor for execution. Such a medium may take many forms, including but not limited to, non-volatile media, volatile media, and transmission media. Non-volatile media includes, for example, optical or magnetic disks, such as a storage device which is part of mass storage. Volatile media includes dynamic memory such as RAM. Transmission media include coaxial cables, copper wire and fiber optics, including the wires that comprise a bus within a computer. Transmission media can also take the form of acoustic or light waves, such as those generated during radio wave and infrared data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to a bus can receive the data carried in the infrared signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Although a method embodiment of the invention is described herein for a printing process, the method can be applied for any type of process that is capable of displaying color images. In the case of a display, the "inks" are not subtractive colorants such as actual printing inks, but are additive primaries for the display process, e.g., the RGB primaries of a monitor. The embodiments described herein, however, are for printing with more than four inks. Display systems using more than three primaries are not is widespread use. In case such display systems ever become available, it would be possible to describe converting to such a display system by modifying the embodiments for multi ink printing described herein, and how to so modify would be clear to one in the art. For a display system, what is referred to herein as a percentage "p" would then not represent an area coverage percentage but rather an amount of an additive primary, e.g., a drive voltage magnitude for a voltage driven display device.

In the embodiment described above, the method of Our Ink patents is used to determine the surface of colors in the third color space of an overprint of varying amounts of two inks with one or more other inks at a preset coverage percentage. The invention does not require the use of the method of Our Ink Patents for this determination of the color in a third color space of an overprint of inks using a specific reproduction process, and in an alternate embodiment, an alternate method is used to determine the color in the third color space of the overprint. U.S. Pat. No. 6,341,175 issued Jan. 22, 2002 to inventor Usami and titled METHOD OF CONVERTING COLOR DATA, describes one alternate method for transforming printer data of four or more inks, such as CMYK data into a device independent color space. As another alternate. see for example, A. U. Agar, "Model Based Separation for CMYKcm Printing", Proceedings of The Ninth IS&T/SID Color Imaging Conference, pp. 298–302, Scottsdale, Ariz. Nov. 5–9, 2001 that contains a section on spectral models for color printers, including describing the color printing process of having a set of overprints, including using more than four colorants. The list on the Agar paper is non-exhaustive. Furthermore, as more methods that determine the color of overprints are developed, such methods can be incorporated into the method of the present invention. The Agar paper is incorporated herein by reference.

While the Plettinck Color Conversion Method is used in one embodiment, another embodiment uses another method for converting from one color space to another color space. Several candidates for such an alternative are known. For example, U.S. Pat. No. 6,362,808 to inventors Loce, et al., filed Mar. 12, 2002, and titled SYSTEMS AND METHODS FOR TEMPLATE MATCHING OF MULTICOLORED IMAGES, describes another method that can be used to map between color spaces, including two ink-based device dependent spaces. U.S. Pat. No. 6,327,052 filed Dec. 4, 2001 to inventor Falk and titled COLOR DATA INVERSION AND RECONVERSION describes another method for converting between color spaces, including ink-based spaces.

While as an example, the CIE Lab, is used as the third color space herein, any alternate suitable color space, e.g., a valid device independent color space, may be used in an alternate embodiment. In the description above, CIE Lab notation is used, and it would be clear that any suitable color space notation can be used for such a color space.

While in one embodiment, the smooth gamut surface at the "high" L-side is constructed such that the lightness is the most important criterion, in another embodiment, the chroma is the most important criterion. This may be applicable in several situations, including for example, for the case when the ink set contains two cyans, a light and a dark one, and two magentas: a light and a dark one. Alternate embodiments use another most important criterion other than chroma or lightness.

Note that in the embodiments described above, one or two darkening inks are chosen for each part of the umbrella surface. In an alternate embodiment, up to three darkening inks are selected: real black, and the complements of each of the inks that vary on the part of the umbrella surface. The conversion for each gamut volume can then be into up to five inks.

Note that in some of the prior art was characterized herein. For example, it was stated that the Granger methods apparently use the maximum real surface colors gamut (Pointer's Gamut). The present invention does not depend on whether or not this characterization is true or on any of the other characterizations of the prior art presented in the Background section.

There have been described herein what are believed to be the preferred embodiments of the invention. Those skilled in the art will recognize that other and further modifications may be made thereto without departing from the spirit of the invention, and it is intended to claim all such changes and modifications as fall within the scope of the invention

What is claimed includes:

1. A method for determining a set of M color gamut parts of a color reproduction process that uses N inks (N>3), M and N being integers, said color reproduction process having a device independent color space having a first, a second and a third dimension corresponding with first, second and third magnitudes respectively, the method comprising the steps of:

determining a set of M umbrella surface parts in said device independent color space, each surface part obtained by the following steps:

defining a domain corresponding to a range of a first ink in combination with a range of a second ink;

identifying a point belonging to said domain having a first amount for said first ink and a second amount for said second ink;

setting a third ink to a predetermined minimum amount and determining a first magnitude corresponding to said first dimension of a color of said first amount of said first ink in combination with said second amount of said second ink in combination with said minimum amount of said third ink;

setting said third ink to a predetermined maximum amount and determining a second magnitude corresponding to said first dimension of the color of said first amount of said first ink in combination with said second amount of said second ink in combination with said maximum amount of said third ink;

defining an umbrella surface part as a locus of colors in said device independence color space corresponding to said domain in combination with said third ink that yields a highest of said first and said second magnitudes corresponding to said first dimension of said device independent color space;

identifying for each of said set surface parts at least one darkening ink that is different from said first, second and third inks; and developing each one of a set of M umbrella surface parts into a color gamut volume part by varying said at least one darkening ink in combination with varying said amount of said first ink and varying said amount of said second ink over said domain.

2. The method of claim 1, wherein the method is applied to a data processing system.

3. A computer readable medium comprising computer program code adapted to perform the steps of the method of claim 1, when said program is executed on a computer.

4. A method for transforming an image represented in a first color space into an image represented in a second color space, said second color space representing amounts of ink of a color reproduction process that uses N inks (N is an integer greater than 3), the method comprising the steps of:

receiving image data represented in the first color space;

determining a set of M color gamut parts by the following steps:

defining a domain corresponding to a range of a first ink in combination with a range of a second ink;

identifying a point belonging to said domain having a first amount for said first ink and a second amount for said second ink;

setting a third ink to a predetermined minimum amount and determining a first magnitude corresponding to said first dimension of a color of said first amount of said first ink in combination with said second amount of said second ink in combination with said minimum amount of said third ink;

setting said at least one third ink to a predetermined maximum amount and determining a second magnitude corresponding to said first dimension of the color of said first amount of said first ink in combination with said second amount of said second ink in combination with said maximum amount of said third ink;

defining an umbrella surface part as a locus of colors in said device independence color space corresponding to said domain in combination with said third ink that yields a highest of said first and said second magnitudes corresponding to said first dimension of said device independent color space;

identifying for each of said set surface parts at least one darkening ink that is different from said first, second and third inks;

transforming said image data into image data represented in said device independent color space;

using a set of M (M is an integer) color gamut volume parts for applying a gamut mapping step in said device independent color space; and transforming said gamut mapped image data into said second color space.

5. A computer readable medium comprising computer program code adapted to perform the steps of the method of claim 4, when said program is executed on a computer.

6. The method of claim 4, wherein the method is applied to a data processing system.

* * * * *